(12) United States Patent
Cadix

(10) Patent No.: US 10,759,988 B2
(45) Date of Patent: Sep. 1, 2020

(54) ENCAPSULATION OF HYDROPHILIC ADDITIVES

(71) Applicant: RHODIA OPERATIONS, Paris (FR)

(72) Inventor: Arnaud Cadix, Saint-Ouen (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/511,801

(22) PCT Filed: Sep. 25, 2015

(86) PCT No.: PCT/EP2015/072146
§ 371 (c)(1),
(2) Date: Mar. 16, 2017

(87) PCT Pub. No.: WO2016/046386
PCT Pub. Date: Mar. 31, 2016

(65) Prior Publication Data

US 2017/0283684 A1 Oct. 5, 2017

(30) Foreign Application Priority Data

Sep. 26, 2014 (EP) .................................... 14290291

(51) Int. Cl.

| | |
|---|---|
| ***C09K 8/516*** | (2006.01) |
| ***C08G 18/64*** | (2006.01) |
| ***C08G 18/79*** | (2006.01) |
| ***C09K 8/506*** | (2006.01) |
| ***F16L 55/1645*** | (2006.01) |
| ***C08G 18/69*** | (2006.01) |
| ***C09K 8/575*** | (2006.01) |
| ***C09K 8/502*** | (2006.01) |
| ***C09K 8/512*** | (2006.01) |
| ***C09K 8/514*** | (2006.01) |
| ***E21B 33/138*** | (2006.01) |

(52) U.S. Cl.
CPC .......... *C09K 8/516* (2013.01); *C08G 18/6423* (2013.01); *C08G 18/698* (2013.01); *C08G 18/792* (2013.01); *C09K 8/502* (2013.01); *C09K 8/506* (2013.01); *C09K 8/512* (2013.01); *C09K 8/514* (2013.01); *C09K 8/575* (2013.01); *E21B 33/138* (2013.01); *F16L 55/1645* (2013.01); *C09K 2208/14* (2013.01)

(58) Field of Classification Search
None
See application file for complete search history.

(56) References Cited

U.S. PATENT DOCUMENTS

| | | | | |
|---|---|---|---|---|
| 5,981,446 | A | 11/1999 | Qiu et al. | |
| 6,035,936 | A * | 3/2000 | Whalen | C09K 8/68 166/308.3 |
| 6,209,646 | B1 | 4/2001 | Fu et al. | |
| 9,499,719 | B2 * | 11/2016 | Cadix | C09K 8/508 |
| 2003/0236171 | A1 | 12/2003 | Nguyen et al. | |
| 2004/0180795 | A1 * | 9/2004 | Su | C09K 8/20 507/200 |
| 2008/0223578 | A1 | 9/2008 | Berkland et al. | |
| 2010/0132948 | A1 | 6/2010 | Fu et al. | |
| 2011/0114318 | A1 | 5/2011 | Ezell et al. | |
| 2011/0237465 | A1 | 9/2011 | Lee et al. | |
| 2011/0306524 | A1 * | 12/2011 | Smith | C09K 8/035 507/136 |
| 2012/0205102 | A1 * | 8/2012 | Lee | C04B 40/0633 166/282 |
| 2013/0056199 | A1 | 3/2013 | Reddy et al. | |
| 2014/0100304 | A1 * | 4/2014 | Cadix | C09K 8/508 523/130 |
| 2017/0283684 | A1 * | 10/2017 | Cadix | C08G 18/6423 |

FOREIGN PATENT DOCUMENTS

WO WO 2012/123319 A1 9/2012

OTHER PUBLICATIONS

Maurstad Gjertrud et al., "Metastable and stable states of xanthan polyelectrolyte complexes studied by atomic force microscopy", Biopolymers, vol. 74, No. 3, Jan. 1, 2004.
Moradi-Araghi Ahmad, "A review of thermally stable gels for fluid diversion in petroleum production" Journal of Petroleum Science and Engineering, vol. 26, No. 1, Jan. 1, 2000.
U.S. Appl. No. 15/511,804, Arnaud Cadix, filed Mar. 16, 2017.

* cited by examiner

*Primary Examiner* — Andrew Sue-Ako

(57) ABSTRACT

The instant invention relates to a process for the encapsulation of a non-amine hydrophilic compound C, comprising the steps of: (E1) providing a reverse emulsion containing: an oil phase (O), comprising a curable mixture of isocyanate and polyalkyldiene hydroxylated or polyol dispersed in said oil phase, drops of an aqueous phase $W^1$, containing: said non-amine hydrophilic compound C; and at least 5% by weight of a compound C carrying more than 2 amine groups; (E2) pouring the reverse emulsion of step (E1) in a second water phase $W^2$ to make a multiple emulsion water/oil/water; and, then, (E3) curing into polyurethane all or part of the curable mixture contained in the oil phase.

11 Claims, No Drawings

ENCAPSULATION OF HYDROPHILIC ADDITIVES

This application is a U.S. national phase entry under 35 U.S.C. § 371 of International Application No. PCT/EP2015/072146, filed on Sep. 25, 2015, which claims priority to European Application No. 14290291.5, filed on Sep. 26, 2014. The entire contents of these applications are incorporated herein by this reference.

The instant invention relates to formulations allowing a controlled release of hydrophilic components downhole during an oil or gas exploration or production operation, e.g. during drilling, completion or hydraulic fracturing processes. The invention especially relates to formulations suitable for releasing an hydrophilic active ingredient contained therein at downhole location where a ultra-high shear is applied, for example specifically at drill bit during drilling operations, e.g. for avoiding loss of servicing fluid during these operations.

One of the most severe case of fluid loss during an oil and gas exploration and production operation is lost circulation during drilling. Lost circulation is a well-known, costly and time-consuming problem, that tends to occur when overpressure applied by drilling mud hydrostatic pressure create fractures in surrounding rocks or if drill bit encounters natural fractures or voids. Drilling mud may then be lost in formation, which may imply that formation pressure cannot be balanced, with poor or no removal of drill cuttings. Depending on the severity, a lost circulation situation induces more or less risks of damaging/losing the well and/or the drilling tools.

Damaging fluid loss situations may also be observed in other operations, for instance during hydraulic fracturing when fluid is pumped at high velocity with a large overpressure in order to create fractures within the formation. In such situations, it is also desirable to avoid fluid penetration within the formation, at least for economic and/or environmental reasons. It also limits formation damage.

In order to inhibit losses or at least to reduce them at least to an acceptable level, it has been proposed to inject a delayed gelling system with the aim to form a gel at the location where the losses occur. Different kinds of delayed gelling system able to form a gel downhole have been described in this connection, intended to prevent further losses and resume circulation. In most of the current available systems, however, it is most difficult to control location of actual gelling of these delayed system and therefore difficult to be sure that the obtained gelification is actually efficient for limiting fluid losses.

As an example, delayed gelling systems have been described that are based on a delayed chemical reaction versus temperature (transamidification of polyacrylamide with a polyethyleneimine triggered by the temperature for example) that is supposed to allow the system to set in appropriate location. Such systems, that have been especially described in U.S. Pat. No. 6,607,035, US 2005/0230113 or US 2012/0132422, lack of precision on the gelation location, which limits their use in practice to water shutoff applications only.

Other delayed gelling systems described in the past rely on downhole mixtures of reactive components initially separated and to be contacted in situ only. These systems need specific delivery tool to ensure that no premature mixing is occurring during the pumping downhole. As an example, reference may be made to US 2005/0199390. It is then difficult to ensure that sufficient mixing is performed once at target location. This implementation is highly time consuming and, in most cases, does not even provide a good insurance of mixing the products at the appropriate location.

An interesting alternative has been described in WO 2012/123319 that relates to an amine polymerization accelerator encapsulated in a polyurethane shell, that is released when triggered by physical means (high shear, high pressure, temperature, crushing, shearing or any combination of the above, for example the conditions at drill bit during drilling operations). More precisely, WO 2012/123319 describes a process for the encapsulation comprising the steps of:

(a) providing a reverse emulsion containing, in an oil phase, a water solution or dispersion (W1) containing the polymerisation activator to be encapsulated, the oil phase including a heat curable mixture of an isocyanate and a polyalkyldiene hydroxylated or polyol;
(b) pouring said reverse emulsion in a water phase (W2) to make a multiple emulsion water/oil/water, containing drops including the activator as the internal water phase; and
(c) heating the obtained multiple emulsion, whereby the polyisocyanate is cured into polyurethane, which leads to drops of activator (W1) enclosed in shells of polyurethane dispersed in water (W2).

WO 2012/123319 describes the use of the encapsulated polymerization accelerator as obtained in step (c) for triggering a quick gelation by polymerisation downhole: the encapsulated accelerator is used in admixture with a polymerisable mixture including (i) water soluble or hydrodispersable acrylated or methacrylated polyoxyethylene and/or polyoxypropylene monomers and (ii) a polymerization initiator (a redox initiator typically) and the polymerisation occurs in situ when the accelerator enters in contact with the initiator and not prior the release of the accelerator. This targeted gelation by control release of the polymerisation accelerator is very interesting but also very specific and implies a complex system, that may be delicate to implement in practice, and especially needs to be used in conditions where the initiator remains stable (compatibility with other components, radical scavenging . . . ).

The instant invention aims at providing an alternative solution to the relatively complex polymerization system disclosed in WO 2012/123319, exhibiting the advantages of the solution of WO 2012/123319 in term of targeted release (typically allowing a release only at drill bit during drilling operations) but which is more polyvalent.

To this end, the instant invention provides a generic method allowing to encapsulate any hydrophilic active ingredient within "breakable polymer capsules" similar to those encapsulating the polymerization accelerator of WO 2012/123319, which allows a wide panel of variations of the specific solution disclosed in WO 2012/123319.

More precisely, according to a first aspect, one subject matter of the instant invention is a process for the encapsulation of a non-amine hydrophilic compound C (typically a water soluble compound, or alternatively a water dispersable compound), said process comprising the steps of:

(E1) providing a reverse emulsion containing:
- an oil phase (herein referred as "phase (O)") comprising (for example consisting in) a curable mixture of
  - isocyanate; and
  - polyalkyldiene hydroxylated or polyol
- dispersed in said oil phase, drops of a water solution or dispersion (herein referred as "phase $W^1$") containing:
  - said non-amine hydrophilic compound C; and at least 5% by weight, based on the total weight of the phase $W^1$, of a compound C' carrying more than 2 amine groups;

(E2) pouring the reverse emulsion of step (E1) in a second water phase (herein referred as $W^2$) to make a multiple emulsion water/oil/water, containing, as the internal water phase, drops including the non-amine hydrophilic compound; and then (E3) curing into polyurethane all or part of the curable mixture contained in the oil phase, whereby a formulation is obtained, containing, dispersed in the phase $W^2$ particles of polyurethane encapsulating an aqueous internal phase including the non-amine hydrophilic compound.

The process for the encapsulation of the compound C according to the invention may be carried out in batch, semi-batch or continuous. Preferably, the process is carried out in continuous.

Another subject matter of the instant invention is the specific formulation of the type obtained in step (E3), comprising drops of a water phase including non-amine hydrophilic compound encapsulated in particles of polyurethane, said particles being dispersed in a water phase.

According to yet another aspect, the invention relates to the use of the formulations as obtained in step (E3) for a delayed release of the compound C.

The compound C used in the present invention, herein-referred as a "non-amine" compound is a hydrophilic compound that is distinct from the polymerisation activator as described in WO 2012/123319. According to a specific mode, that corresponds to most cases, the compound C does not contain any amine group. According to another more specific embodiment, it is not excluded that the compound C may comprise amine groups. As an example, compound C may e.g. be EDTA.

In the scope of the instant invention, it has now been surprisingly found that the specific encapsulation disclosed in WO 2012/123319 for amines may actually be successfully and efficiently obtained for other non-amine hydrophilic compounds, provided that the internal phase to be encapsulated contains, in addition to the non-amine hydrophilic compound, a sufficient quantity of a compound carrying several amine groups.

More precisely, it has been found that the compound C' present with compound C in the phase $W^1$ in step (E1) reacts with some isocyanate compounds present in phase (O), which leads to the formation of stabilizing species at the interfaces between phase (O) and phase ($W^1$). Which implies that the emulsion of step (E1) is stabilized in the same way than in the process of WO 2012/123319 whatever the nature of compound C. In other words, compound C' acts as a stabilizer of the emulsion of step (E1) (and consequently also of the multiple emulsion of step (E2)) generally without influence of the nature of compound C, which authorizes the encapsulation of any hydrophilic compound C that does not react with compound C'.

Especially due to the specific stabilizer effect of compound C', the emulsion of step (E1) and the multiple emulsion of step (E2) do not need to comprise any additional surfactant, emulsifier or stabilizer. Such additives may optionally be present, but, according to a specific embodiment, the phases (O), (W1) and (W2) do not contain any surfactant or emulsifier in addition to the heat curable mixture and the compound C and C' and reaction products of these compounds.

Whatever the exact nature of compound C, the formulations as obtained according to step (E1) to (E3) of the instant invention includes said compound C encapsulated in a polyurethane shell, that is broken when the formulation is subject to a sufficient physical constraint, such as high shear, high pressure, temperature, crushing, shearing or any combination of the above, for example the conditions at drill bit during drilling operations, or within the fractures during fracturing process. In other words, the formulation as obtained in the instant invention contains compound C in a masked form and the compound is reactivated only when submitted to proper physical conditions, e.g. downhole in drilling or fracturing conditions. Typically, the compound is reactivated when submitted to physical conditions including high shear, crushing, shearing or any combination of the above. In most cases, there is no need of high pressure or high temperature, and therefore, according to a first embodiment, the reactivation of compound C is obtained at low temperature or pressure. According to another embodiment, the reactivation may of course be obtained with higher temperature and pressure, even if they are not necessary for releasing the compound C.

For example, the formulation obtained in the scope of the instant invention are especially suitable for allowing a targeted release of the compound C just at the drill bit during a drilling process. Typically, a drill bit comprises nozzles that are restrictions of about 4 to 10 mm (depending on the tool) through which drilling fluid flows at about 80 to 120 m/s and pressure drop at the restriction is generally 25 to 50 bars. Such high shear conditions trigger the release of an encapsulated active ingredient.

In the scope of fracturing, a formulation as obtained according to the invention is able to selectively release the compound C only in zones submitted to high shear rate, namely fractures in formation and fractures closure at the end of a fracturing operation.

Different features and specific embodiments of the invention are described in more details herein-after.

The Oil Phase (O)

A great number of oil phases may be used as oil phase (O) used according to the invention.

Preferably, the oil phase (O) has a viscosity lower than the viscosity of phase ($W^1$) in the conditions of steps (E1) and (E2).

According to a specific embodiment, the oil phase (O) consists in the curable mixture of isocyanate and a polyalkyldiene hydroxylated or polyol.

Alternatively, the oil phase (O) may optionally contain one or more additives selected e.g from a solvent and a plasticizer can be added to the oil phase. Possible solvents or plasticizers includes, but are not limited to, di-isobutyl ester of succinate, glutarate or adipate, petroleum distillates, natural oils, fatty acids esters. The addition of solvent or plasticizer especially allows to tune the mechanical properties of the polyurethane shells.

Suitable isocyanates for the heat curable mixture present in phase (O) are alpha, omega-aliphatic diisocyanates.

These aliphatic diisocyanates, to be condensed with polyalkyldiene hydroxylated or polyol, are either isocyanate molecules, referred to as monomers, that is to say non poly-condensed, or heavier molecules resulting from one or more oligocondensation(s), or mixtures of the oligocondensates, optionally with monomer.

The commonest oligocondensates are biuret, the dimer and the trimer (in the field under consideration, the term "trimer" is used to describe the mixtures resulting from the formation of isocyanuric rings from three isocyanate functional groups; in fact, there are, in addition to the trimer, heavier products are produced during the trimerization reaction).

Mention may in particular be made, as monomer, of polymethylene diisocyanates, for example, TMDI (TetraMethylene DiIsocyanate) and HDI (Hexamethylene DiIsocyanate of the formula: OCN—$(CH_2)_6$—NCO and its isomers (methylpentamethylene diisocyanate)].

It is desirable, in the structure of the or of one of the isocyanate monomer(s), for the part of the backbone connecting two isocyanate functional groups to comprise at least one polymethylene sequence. Mention may also be made of the compounds resulting from the condensation with diols and triols (carbamates and allophanates) under substoichiometric conditions. Thus, in the isocyanate compositions, it is possible to find:

- isocyanurate functional groups, which can be obtained by catalyzed cyclocondensation of isocyanate functional groups with themselves,
- urea functional groups, which can be obtained by reaction of isocyanate functional groups with water or primary or secondary amines,
- biuret functional groups, which can be obtained by condensation of isocyanate functional groups with themselves in the presence of water and of a catalyst or by reaction of isocyanate functional groups with primary or secondary amines,
- urethane functional groups, which can be obtained by reaction of isocyanate functional groups with hydroxyl functional groups.

The polyalkyldiene hydroxylated or polyol present in the heat curable mixture may be any compound carrying at least 2 —OH groups and that is fully solubilized in the phase (O). It may be for example a polyester, acrylate, polyurethane prepolymer or modified polybutadiene Preferably, it comprises (and preferably consists in) an hydroxylated polybutadiene.

The curing of the curable of step (E3) may be a heat curing, carried out by heating the multiple emulsion obtained in step (E2), typically at a temperature of between 50 and 95° C., but it advantageously can also be a lower temperature curing, typically carried out between 15 and 30° C., for instance at room temperature.

The First Water Phase (W)

This is the internal water phase of the emulsion of step (E1), which forms the most internal water phase in the multiple emulsion of step (E2).

Preferably, the phase ($W^1$) has a viscosity lower than the viscosity of oil phase (O) in the conditions of steps (E1) and (E2). To this end, if needed, at least one viscosifier may be added, for example a neutral hydrophilic polymer such as a polyethylene oxide.

Optionally, a surfactant may be added to this water phase ($W^1$), preferably a non-ionic surfactant, for example a di-$C_1$-$C_8$ alkyl ester of a saturated or unsaturated fatty acid having 12 to 22 carbon atoms. Such a surfactant may e.g. be used in the water phase ($W^1$) when at least one of compound C and/or C' is not soluble in phase ($W^1$), and the surfactant may then help to maintain the compound C and/or C' dispersed or in solution. However, as indicated hereinabove, an additional surfactant is generally not needed in the phase ($W^1$). At least for economical reason, it is preferable not to implement any additional surfactant in the phase ($W^1$).

Optionally, the water phase ($W^1$) may include fatty acid ester, for example esters of rapeseed oil ester, preferably with lower alcohol (methyl or ethyl ester are preferred. These esters may especially act as plasticizers and allows to tune the mechanical properties of the polyurethane shells.

The Second Water Phase ($W^2$)

This is the continuous phase of the multiple emulsion formed in step (E2).

Preferably, the water phase ($W^2$) of step contains a mineral salt for example NaCl and/or xanthan gum or another similar polymer, and more preferably both a mineral salt and xanthan gum or another similar polymer. The presence of a mineral salt such as NaCl allows to balance the osmotic pressure, thereby preventing the reverse emulsion of step (E1) from bursting. Xanthan gum may be used as protective colloid and rheological agent, and may be substituted in all or part by any other similar polymer including, e.g., gelatin, pectin, derivative of cellulose, arabic gum, guar gum, locust bean gum, tara gum, cassia gum, agar, modified starch such as n-octenyl starch or porous starch, alginates, carraghenanes, chitosan, scleroglucan, diutan polyvinyl alcohol, polyvinyl pyrrolidone and mixtures thereof.

The Non-Amine Compound C

Any compound, or mixture of compounds that may be dissolved or dispersed in the first water phase ($W^1$) in the conditions of steps (E1) and (E2) may be used as the compound C in the scope of the instant invention. Compound C is clearly distinct from compound C' and does not carry any amine group.

Compound C may be present in the phase ($W^1$) at a relatively high content, typically up to 80% by weight, based on the total weight of the phase $W^1$. The content of compound C in the phase ($W^1$) is typically between 2 and 80%, for example between 5 and 75%, the content being preferably of at least 10%, more preferably of at least 20% by weight, based on the total weight of the phase $W^1$.

More specific and non-limitative examples of possible compounds (C) are given thereafter in the section "applications".

The Compound C'

The compound C' is the compound acting as a stabilizer of the interface between the phase (O) and the first water phase ($W^1$). To this end, compound C' carries more than 2 amine groups. The expression "more than 2 amine groups" herein designate: either a unique compound carrying at least 3 amine groups; or a population of different compounds (a population of polymer typically) carrying a variable number of amine groups, with a mean number of more than 2 (preferably of more than 2,5 in that case, and even more preferably of at least 3).

Compound C' may also influence the viscosity of the first water phase ($W^1$). In this connection it is especially suitable to make use of polymers carrying amine groups, that enhance the viscosity of the water phase ($W^1$), even if non polymeric compounds C' may also be contemplated.

The amine groups carried by the compound C' are preferably primary or secondary amine groups, and more preferably primary amine groups —$NH_2$. Preferably, a compound C' used according to the invention comprises more than 2, preferably at least 3, primary or secondary amine groups. More advantageously, a compound C' used according to the invention comprises more than 2, preferably at least 3, primary amine groups —$NH_2$.

According to a specific embodiment, the compound C' according to the invention may be a an amino compound like an alkyldiamine, polyalkylen amine or poly alkylen imine whose alkyl or alkylen part comprises 2-4 carbon atoms.

Alternatively, primary or secondary amines or amine hydrochlorides can be employed.

Interesting compound C' according to the invention include e.g. tetraethylenepentamine, hexaethylenediamine, Bis(hexamethylene)triamine polyvinylamine and copolymers, polyethyleneimine, 4,4'-Oxydianiline, 3,3'-Diaminobenzidine.

According to a preferred embodiment, the compound C' includes (and more preferably consists in) a polyethyleneimine (PEI) or a mixture of polyethyleneimine. An especially suitable polyethyleneimine is commercially available from the firm BASF under the name of Lupasol®.

Whatever its nature, the compound C', this compound is preferably introduced in the phase ($W^1$) at a content of at least 5% by weight, more preferably at least 10% by weight, based on the total weight of the phase $W^1$.

The Formulation of Encapsulated Compound C Obtainable According the Invention

The specific features of a formulation as obtained after the heating of step (E3) depend on the exact nature of the different compounds implemented in their preparation.

Generally speaking, the obtained formulation includes particles of polyurethane having typically an average diameter of between 10 and 1500 μm, preferably between 300 and 800 μm, with drops including compound C dispersed therein.

Applications

One major application of the formulation as obtained according to the invention, that comprise the compound C in a encapsulated form are in the scope of oil recovery, especially in drilling (with a release of the compound C at the drill bit) and fracturing (with release of compound C as capsules are sheared entering the fractures and as fractures are closing at the end of the fracturing operation).

According to a specific embodiment, the compound C may be a boric acid.

In that case, the formulation of the invention is generally used in admixture with molecules able to complex the boric acid, such as molecules of guar, forming a borate gel when in contact with the boric acid, according to a well known and widely used process used in oilfield operation. The formulation of the invention constitute in this scope a very advantageous alternative to the masked form of boric acid usually implemented for forming a borate gel downhole. In the methods described until today, the boric acid has to be introduced in a complexed form and a progressive decomplexation occurs after injection, leading to a release difficult to control. On the contrary, a formulation according to the invention, including an encapsulated boric acid, constitutes a very specific masked form of boric acid, for which the release can be accurately controlled. For example, by using a drilling fluid including a boric acid encapsulated according to the invention in admixture with guar, it is possible during to specifically form the gel exclusively at drill bit drilling operations.

Alternatively, the compound C used in the scope of the invention may be another crosslinker of the guar similar to boric acid, such as a zirconate, titanate or aluminate complex.

According to another alternative, the compound C used in the scope of the invention may be a dispersing agent or a clay inhibitor, that may be used for example in drilling processes, especially in drill in processes, for cleaning the walls of the well or avoiding the deposit of impurities or clay in the zone around the drill bit.

More generally, a formulation according to the invention can be used for injecting within a fluid a compound C that is not compatible with the fluid, and that will be released only downstream, whereby the compound C does not interact negatively with the fluid during its transport to the targeted zone where it has to be released. For example, it is known that some clay inhibitors are not compatible with drilling fluids. Such incompatible compounds may now be implemented in drilling fluid, in the form encapsulated according to the invention, and they are released in a targeted zone only, typically at the drill bit.

The invention will now be further illustrated by the following illustrative examples.

EXAMPLE 1

Encapsulation of Boric Acid According to the Invention

Preparation of a Reverse Emulsion

An aqueous medium w1 containing 10% by weight of boric acid was prepared by dissolving 38.5 mg of boric acid in 270 g of an aqueous solution of Polyethyleneimine (PEI at 50% by weight in water: Lupasol P from BASF) in 75 g of water.

The aqueous medium was dispersed within an oil phase as follows:

A mixture m1 was prepared, containing 500 g of a hydroxylated (OH functionalized) butadiene of molecular weight 2000 g/mol and an average 2.6 hydroxyl function per chain. and t500 g of a rapeseed oil methyl ester with an acid index below 0.2 mg KOH/g. 75.17 g of the aqueous medium w1 were mixed with 71.75 g of the mixture m1 to form an emulsion, and then 9.56 g of isophorone di-isocyanate trimer supplied diluted with 30% wt butyl acetate (Tolonate IDT 70B from Perstorp). was added to the formed emulsion. The particle size of the emulsion is set by acting on the agitation speed. The mixing time after the addition of isocyanate is set to 5 mn.

Preparation of a Multiple Emulsion

An aqueous phase w2 was prepared by mixing 111 g of NaCl and 5.05 g of xanthan gum (Rhodopol 23P available from the firm Solvay) in 883.3 g of water.

The reverse emulsion, as freshly obtained according to the previous step, was poured slowly into 330.3 g of this phase w2 under agitation (3 blades paddle) and then dispersed under vigorous stirring. conditions to achieve a multiple emulsion.

Formation of the Polyurethane Shells

The obtained multiple emulsion was allowed to cure at room temperature (20° C.).

EXAMPLE 2

Formation of a Borate Gel from the Formulation of Example 1

5 g of the formulation prepared in example 1, containing boric acid encapsulated in polyurethane shells, was mixed with 200 g of an aqueous solution comprising 0.5% by weight of a guar (Jaguar 322 available from the firm Solvay) and 2% of KCl.

A solution of very low viscosity, easily pumpable, is obtained (270 mPa·s at 1 $s^{-1}$) and the solution remains of low viscosity at low and moderate shear.

When applying a high shear using a Silverson 4LRT rotor stator blender equipped with a 2 mm square hole high shear screen workhead at 7000 rpm, a gelation is triggered (due to the liberation of the boric acid), and a high viscosity is obtained (5550 mPa·s at 1 $s^{-1}$).

The invention claimed is:

1. A process for the encapsulation of a non-amine hydrophilic compound C, wherein the non-amine hydrophilic compound C does not contain any amine groups and is boric acid, or a zirconate, titanate or aluminate complex, the process comprising the steps of:

(E1) providing a reverse emulsion containing:

an oil phase (O), comprising a curable mixture of isocyanate; and hydroxylated polyalkyldiene or polyol dispersed in said oil phase, drops of a water solution or dispersion (aqueous phase $W^1$), containing:

said non-amine hydrophilic compound dissolved therein; and at least 5% by weight, based on the total weight of the phase $W^1$, of a compound C' carrying more than 2 amine groups, wherein the compound C' includes at least one polyethyleneimine;

(E2) pouring the reverse emulsion of step (E1) in a second water phase $W^2$ to make a multiple emulsion water/oil/water, containing, as the internal water phase, drops including the non-amine hydrophilic compound C; and, then, (E3) curing into polyurethane all or part of the curable mixture contained in the oil phase, whereby a formulation is obtained, containing, dispersed in the phase $W^2$ particles of polyurethane encapsulating an aqueous internal phase including the non-amine hydrophilic compound C.

2. The process of claim 1, wherein the oil phase (O) has a viscosity lower than the viscosity of phase ($W^1$) in the conditions of steps (E1) and (E2).

3. The process of claim 1, wherein the water phase ($W^1$) includes fatty acid esters.

4. The process of claim 3, wherein the fatty acid esters are esters of rapeseed oil.

5. The process of claim 1, wherein the water phase ($W^2$) contains a mineral salt.

6. The process of claim 5, wherein the mineral salt is NaCl.

7. The process of claim 1, wherein the water phase ($W^2$) contains a protective colloid and rheological agent.

8. The process of claim 7, wherein the protective colloid and rheological agent is xanthan gum.

9. A formulation obtained according to the process of claim 1, comprising drops of a water phase including non-amine hydrophilic compound encapsulated in particles of polyurethane, said particles being dispersed in a water phase.

10. A method for allowing a targeted release of a compound C just at the drill bit by drilling with the formulation of claim 9.

11. A method for allowing a targeted release of a compound C, wherein capsules comprising the formulation of claim 9 are sheared entering the fractures and as fractures are closing at the end of a fracturing operation.

* * * * *